(12) United States Patent
Ni et al.

(10) Patent No.: US 7,720,266 B2
(45) Date of Patent: May 18, 2010

(54) ULTRASOUND IMAGE ENHANCEMENT AND SPECKLE MITIGATION METHOD

(75) Inventors: Dong Ni, Nanshan (CN); Lei Zhu, Nanshan (CN); Qinjun Hu, Nanshan (CN); Helin Feng, Nanshan (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1180 days.

(21) Appl. No.: 11/318,421

(22) Filed: Dec. 23, 2005

(65) Prior Publication Data

US 2007/0065009 A1   Mar. 22, 2007

(30) Foreign Application Priority Data

Aug. 26, 2005   (CN) .................. 2005 1 0036841

(51) Int. Cl.
*G06K 9/00* (2006.01)
(52) U.S. Cl. .............. 382/128; 382/131; 382/172; 382/173; 382/257; 382/263; 382/272; 382/274; 600/437; 600/461; 600/444; 378/37; 378/63
(58) Field of Classification Search ................ 382/131, 382/260, 173, 257, 199, 205, 128, 232, 172, 382/272, 280, 282; 345/441, 589, 426, 428; 600/443, 407, 437, 472; 435/6; 358/426, 358/467

See application file for complete search history.

(56) References Cited

U.S. PATENT DOCUMENTS

| | | | |
|---|---|---|---|
| 6,071,496 A | 6/2000 | Stein et al. | |
| 6,102,864 A | 8/2000 | Hatfield et al. | |
| 6,141,460 A * | 10/2000 | Amer et al. | 382/257 |
| 6,196,971 B1 | 3/2001 | Prater et al. | |
| 6,208,763 B1 * | 3/2001 | Avinash | 382/254 |
| 6,234,960 B1 | 5/2001 | Aboul-Hosn et al. | |
| 6,466,687 B1 * | 10/2002 | Uppaluri et al. | 382/128 |
| 6,592,523 B2 * | 7/2003 | Avinash et al. | 600/443 |

(Continued)

FOREIGN PATENT DOCUMENTS

CN   1238505 A   12/1999

(Continued)

OTHER PUBLICATIONS

Yuan, Dong et al., "Edge Detection Method for Cranial Cavity CT Images," Chinese Journal of Biomedical Engineering, vol. 17, No. 4, Dec. 1998.

*Primary Examiner*—Wes Tucker
*Assistant Examiner*—Nancy Bitar
(74) *Attorney, Agent, or Firm*—Kory D. Christensen; Stoel Rives LLP

(57) ABSTRACT

A method for enhancing an ultrasound image is provided, wherein the ultrasound image is segmented into a feature region and a non-feature region, while sufficiently utilizing features contained in the ultrasound image, in particular including some inconspicuous features. The enhanced image according to present invention is not susceptive of the image segmentation and avoid dependence of the enhancement effect on the segmentation template, so as not to produce an evident artificial boundary between the feature region and the non-feature region but to highlight some special information in the image and to remove or mitigate invalid information. Thus the enhanced ultrasound image is particularly suitable for the visual system of the human beings.

3 Claims, 7 Drawing Sheets

U.S. PATENT DOCUMENTS

| | | | |
|---|---|---|---|
| 6,674,879 B1 * | 1/2004 | Weisman et al. | 382/128 |
| 6,912,309 B2 * | 6/2005 | Lee | 382/197 |
| 7,348,991 B1 * | 3/2008 | Keating et al. | 345/589 |
| 7,512,284 B2 * | 3/2009 | Avinash | 382/266 |
| 2003/0097069 A1 * | 5/2003 | Avinash et al. | 600/447 |
| 2007/0165916 A1 * | 7/2007 | Cloutier et al. | 382/128 |

FOREIGN PATENT DOCUMENTS

| | | |
|---|---|---|
| CN | 1559346 A | 1/2005 |
| CN | 1596832 A | 3/2005 |
| CN | 1604756 A | 4/2005 |
| CN | 1660015 A | 8/2005 |
| JP | 03-222945 | 10/1991 |
| WO | 2005048190 A1 | 5/2005 |

\* cited by examiner gray scale not adjusted      gray scale adjusted

ULTRASOUND IMAGE ENHANCEMENT AND SPECKLE MITIGATION METHOD

FIELD OF THE INVENTION

The present invention relates to ultrasound techniques, and more particularly, to data processing techniques in ultrasound imaging, especially to an image enhancement and speckle mitigation method for improving the quality of ultrasound images.

BACKGROUND OF THE INVENTION

FIG. 1 shows a block diagram of a typical ultrasound imaging system. It operates as follows: under the control of a main controller, a probe transmits an ultrasound to a body tissue to be tested, and receives an echo signal reflected from the body tissue after a certain delay. The echo signal is fed into a beam former, which performs focus for delay, weighting and channel accumulation to generate signals on one or more scan lines. A detector detects the scanning signals output from the beam former and feeds them into a DSC (Digital Scanning Converter), where a coordinate conversion is implemented. The resulted image data is sent to a computing device (generally including a built-in processor, a FPGA circuit, even a computer system or the like). An image enhancement module located in the computing device processes the image data and feeds it into a monitor for display. Alternatively, the ultrasound imaging system may invoke an image sequence stored in an external memory, process them by means of the image enhancement module and then display them.

Here, the ultrasound imaging system employs the image enhancement module to realize post-processing of image, which aims at improving the quality of ultrasound images and assisting medical diagnosis, in particular, by overcoming problems in two aspects. The first aspect is to enhance significant structures or features in the image which interest the doctors, including bones, capsules, canals, cavities or the like. That is to say, all distinguishable structures should remain in the resulted image after ultrasound image enhancement, including normal and abnormal structures, while providing sufficient textural and contrast information. In the second aspect, speckles should be suppressed. If the reflection surface of a tissue within the human body is not so smooth that the coarseness of surfaces are equal to the wavelength of the incoming ultrasound, the echo signals generated by different reflection sources may overlay or counteract due to phase difference. Such an overlay or counteraction is represented visually as grains of the image. As such, speckle noises are always present when scan line data at different locations are processed and combined to form a final ultrasound image. The speckle noises will mask some useful information in the image, thus interfering with the doctor's diagnosis to some extent. Speckle mitigation is thus another object for enhancing image.

In relation to the above problems, an image enhancement method with a gradient-based segmentation is disclosed in U.S. Pat. Nos. 6,208,763 and 6,592,523. In this method, an image is segmented into a structural and a non-structural region according to the gradient information. Anisotropy sharpening is performed on the structural region based on Intensity-weighted $2^{nd}$ order directional derivative, to enhance contrast of edges of the image. Isotropic smoothing is performed on the image data classified as a non-structural region, to mitigate speckle noise. The above prior art, however, has the following disadvantages: (1) although the method in the patent advantageously segments an image into a structural and a non-structural region, but it leaves out some inconspicuous features by only taking gradient scale information into account, in particular, the enhancement effect relies too much on the segmentation template when the structural region takes the gray-scale of the image as the sharpening coefficient, and too much discontinuity will occur at the edges of the segmentation template. Accordingly the enhancement effect is not ideal; and (2) linear smoothing of the non-structural region cannot mitigate speckle noises greatly.

SUMMARY OF THE INVENTION

The present invention is made in view of the above disadvantages.

According to on object of present invention, there's provided a method for enhancing an ultrasound image, wherein the ultrasound image is segmented into a feature region and a non-feature region, while sufficiently utilizing features contained in the ultrasound image, in particular including some inconspicuous features, for enhancing the ultrasound image.

According to another object of present invention, there's provided a new method of processing the feature region, which can make the enhanced image not susceptive of the image segmentation and avoid dependence of the enhancement effect on the segmentation template, so as not to produce an evident artificial boundary between the feature region and the non-feature region but to highlight some special information in the image and to remove or mitigate invalid information.

According to another object of present invention, there's provided a method of mitigating speckle noises, in particular black speckles in the ultrasound image.

A final ultrasound image resulted from the method for enhancing the ultrasonic image and the method for mitigating speckles is particularly suitable for the visual system of the human beings.

According to one aspect of present invention, there's provided a method for an enhancing ultrasound image for use in an ultrasound imaging system, comprising steps of:

A) reading the ultrasound image;

B) segmenting the ultrasound image into a feature region and a non-feature region based on gradient information and gray-scale information in the image, and then performing different data processing on the image classified as the feature region and the non-feature region respectively;

C) merging the processed feature region and non-feature region to produce an enhanced image.

Preferably, wherein the step of segmenting the image comprises a step of extracting distinct boundaries in the image by means of the gradient information and a step of extracting brighter region in the image by means of the gray-scale information to generate a gray image template.

Preferably, wherein the step of segmenting the image further comprises a step of extracting weak boundaries in the image by means of variance information in the ultrasonic image, to generate a variance image template.

Preferably, the step of segmenting the image further comprises a step of post-processing the variance image template to produce a segmentation template, wherein the feature region being set as the image region indicated by the segmentation template.

Preferably, wherein the step of post-processing the variance image template further comprises a step of averaging the segmentation template of continuous frames, wherein for a feature region newly added to the image template of current frame, the feature region is filled in as a part of the segmentation template only if several continuous frames for the feature region satisfy a segmentation condition.

According to a second aspect of present invention, the data processing on image data classified as the feature region comprising a step of anisotropy smoothing the image data which comprises sub-steps of:
 a) determining a local dominant orientation for each pixel; and
 b) smoothing each pixel in a direction normal to the local dominant orientation.

In a preferable mode, the data processing on the image data classified as the feature region further comprises a step of anisotropy sharpening the anisotropically smoothed pixels, comprising sub-steps of:
 a) computing an orientational Laplacian for each of the smoothed pixels in the local dominant orientation; and
 b) multiplying the orientational Laplacian with an image-sharpening coefficient $R_{sharpen}$, to produce an anisotropically sharpened result.

In a preferable mode, the image sharpening coefficient $R_{sharpen}=C*std*(M_{frame\_ave}-MID)/5$, Where C is a predetermined constant, std is the standard variation for gray image within a neighborhood of each pixel, $std=\sqrt{E[I-E(I)]^2}$, wherein I represents a gray scale intensity, $M_{frame\_ave}$ is the template frame-averaging matrix used when segmenting the image, and MID is a predetermined value corresponding to the template frame-averaging matrix.

According to a third aspect of present invention, speckle noise is suppressed by locally adjusting the gray scale intensity of the image data classified as the non-feature region, comprising
 a) dividing the input image into blocks, and computing a gray scale mean of each blocked image, $Mean_{block}$;
 b) setting different gray-scale adjustment coefficients $R_{adjust}$ based on the different gradient values of various pixels in the input ultrasonic image; and
 c) computing an adjusted gray scale intensity $I_{adjusted}$ to produce a local gray-scale adjusted image,
 $I_{adjusted}=Mean_{block}+(I_{in}-Mean_{block})*R_{adjust}$, wherein $I_{in}$ represents the gray scale intensity of the input image.

In a preferable mode, black speckles are further suppressed by processing the local gray-scale adjusted image, comprising:
 i) computing a mean image represented by its gray scale intensity $I_{mean}$ for the input image $I_{in}$ or the local gray-scale adjusted image $I_{adjusted}$ by using a neighbor domain of each pixel with variable size;
 ii) determining a compensating pixel and its respective compensating amount based on the mean image $I_{mean}$; and
 iii) adding the compensating amount for each compensating pixel into the input image $I_{in}$ or the local gray-scale adjusted image $I_{adjusted}$, to remove the speckles from the non-feature region.

In a preferable mode, the compensating pixel means a pixel for which an image difference $I_{diff}$ obtained by subtracting the mean image $I_{mean}$ from the input image $I_{in}$ or the local gray-scale adjusted image $I_{adjusted}$ is greater than a predetermined value; and the compensating amount for the compensating pixel is multiples of the respective difference $I_{diff}$.

With the above technical solutions, the feature information in the ultrasonic image may be extracted and enhanced more effectively, and the image enhancement effect relies slightly upon the image segmentation, while it is advantageous to mitigate black speckles. The enhanced image is thus more suitable for the visual system of the human beings and more helpful for reference in medical diagnosis. The above and other advantages of present invention will be described with reference to the accompanying drawings.

DETAILED DESCRIPTION OF THE PREFERRED EMBODIMENTS

Detailed descriptions will be made below to the invention, in conjunction with a preferred embodiment as shown in the accompanying drawings.

Figure 1:
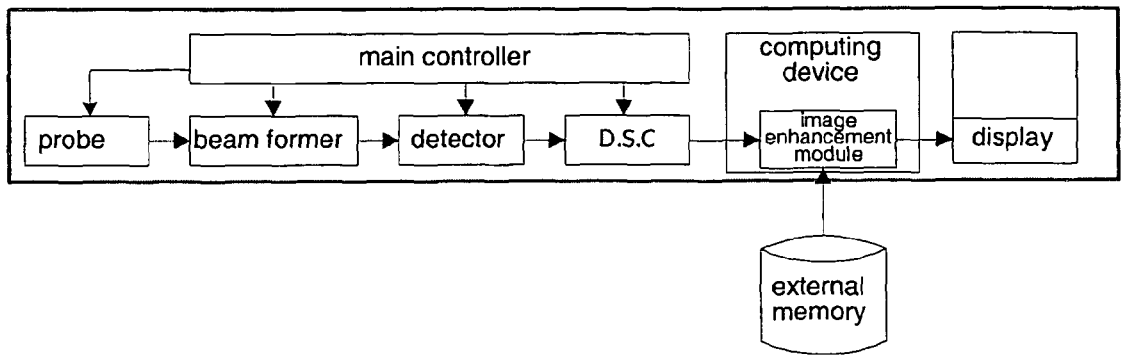
FIG. 1 shows a block diagram of an ultrasound imaging system according to present invention.

The invention can be implemented with the ultrasound imaging system shown in FIG. 1.

Figure 2:
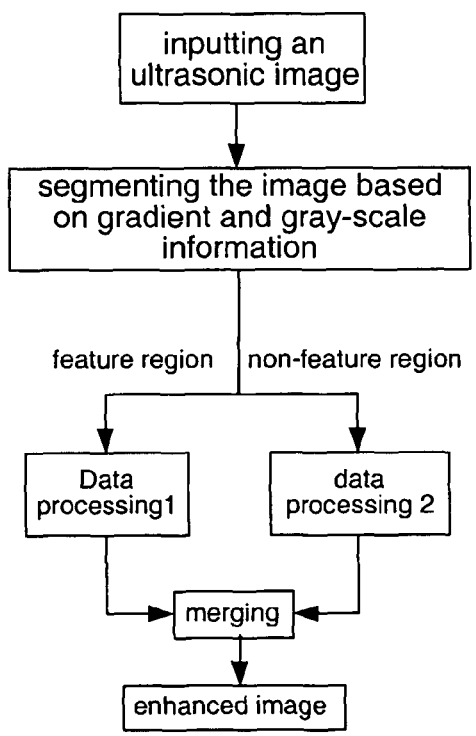
FIG. 2 shows a diagram of enhancing the ultrasound image according to present invention.

The method for enhancing an ultrasound image as provided in the invention is used by an ultrasound imaging system to optimize display of an ultrasound scanned image. As shown in FIG. 2, the system first reads the input ultrasound image data and then segments the image into a feature region and a non-feature region according to the gradient information and gray information in the image; sequentially, performing data processing (1) on the image data classified as the feature region and data processing (2) on the image data classified as the non-feature region, respectively. At last, the processed feature region and non-feature region are merged, to produce enhanced image data corresponding to the original ultrasound image, and then the enhanced image data are output for display or storage. Detailed description will be given below to various processes according to present invention.

1. Image Segmentation

In the invention, a feature region is defined as a region having rich image variations and higher brightness, and a non-feature region are defined as others except the feature region. Generally, the gray scale intensities of pixels in a non-feature region are relatively consistent. To extract different types of features from an image, the image segmentation according to present invention is based on gradient information and gray information. Gradient information is used to extract distinct boundaries from the image and gray-scale information is used to select brighter region. More preferably, variance information may be used in the image segmentation process, wherein variance may be used to extract boundaries of the image that are not distinct but need further enhancement (also referred to as "weak boundary"). In present invention, the segmentation of the image into a feature region and a non-feature region is the basis. The segmentation process will be described in detail below.

Figure 3:
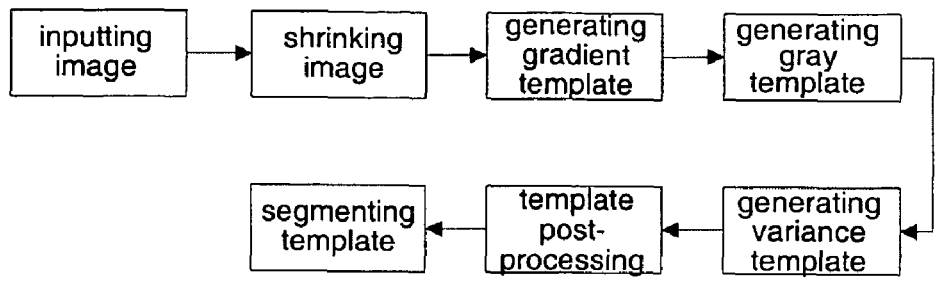
FIG. 3 shows a diagram of segmenting the image according to present invention.

Referring to FIG. 3, the system first shrinks the read ultrasound image, so as to increase the computation speed and decrease the impact from the noise in the original image upon computation. For example, but not limited to, the input image represented by its gray scale intensity $I_{in}$, is shrunk to produce a shrunk image represented by its gray scale intensity $I_{shrunk}$ whose side length is half as that of the original. Then, the system segments the shrunk image $I_{shrunk}$ by using the gradient information in the image, to produce a gradient image template. Next, the system uses the gray information of the image $I_{shrunk}$ to modify the gradient image template, to produce a gray image template, and then the local variance information of the image $I_{shrunk}$ is used to modify the gray image template, to produce a variance image template. At last, a segmentation template is obtained by post-processing the variance image template, wherein the feature region correspond to the image region included in the segmentation template. Here, the gradient image template, the gray image template and the variance image template have a relationship as follows: the gray image template includes image pixels within the gradient image template and the variance image template includes image pixels within the gray image template. Detailed description will be made below to the gradient processing, gray-scale processing, variance processing and template post-processing thereof.

1.1 Gradient Processing

Figure 4:
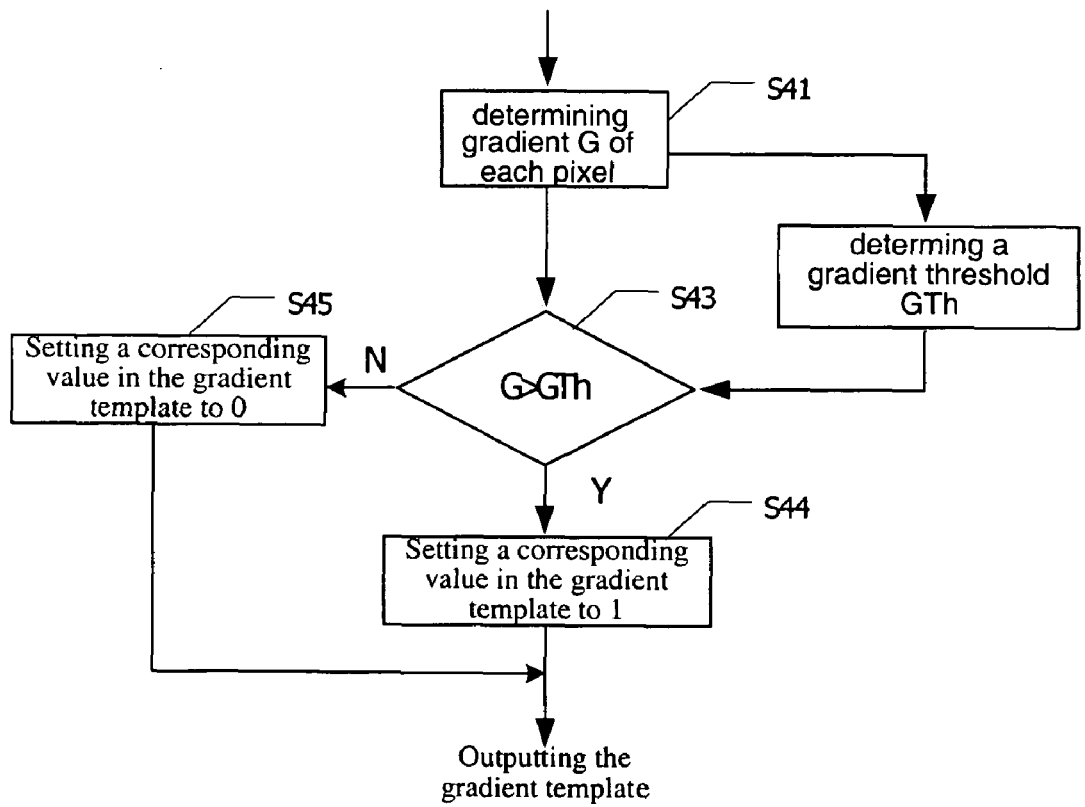
FIG. 4 shows a flow chart of generating a gradient image template in image segmentation process according to present invention.

FIG. 4 shows the generation process of the gradient image template. At step S41, the gradient $grad_x$ in the horizontal direction and the gradient $grad_y$ in the vertical direction for each pixel in the shrunk image $I_{shrunk}$ are computed. To simplify computation, a simplified gradient G is defined as:

$$G=\max(|grad_x|,|grad_y|).$$

At step S42, a gradient threshold is so set that the number of pixels in the image each having a gradient value greater than the gradient threshold GTh accounts for a predetermined percentage (for example, 25%) of total pixels. At step S43, gradient G of each pixel is compared to the threshold GTh; if G>GTh, a value in the gradient image template corresponding to said pixel is set to 1 in step 44; otherwise the value set to 0 in step S45. The process is repeated until the gradient values of all the pixels in the image are compared. Finally, the resulted gradient image template shall include those pixels whose gradient values exceed the threshold GTh, and thus the distinct boundary information is extracted from the image.

1.2 Gray-scale Processing

Figure 5:
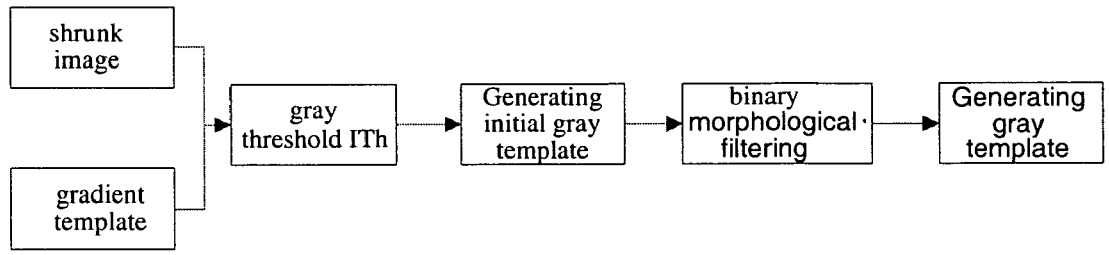
FIG. 5 shows a diagram of generating a gray image template in the image segmentation process according to present invention.

FIG. 5 shows the generation process of the gray image template. The gray scale intensity for each pixel in the shrunk image $I_{shrunk}$ is determined, and then a gray threshold ITh is set, for example but not limited herein, the threshold is set to multiples of the average gray scale intensity of the pixels included in the gradient image template (i.e., those pixels with a value of 1 in the gradient image template), such as 1.5. In this way, an initial gray image template is produced so that it includes those pixels in the gradient image template and the pixels in the shrunk image $I_{shrunk}$ of which gray scale intensities are greater than ITh (i.e., setting a value corresponding to a pixel in the shrunk image $I_{shrunk}$ with its gray scale intensity greater than ITh to 1 and then adding the corresponding value to the gradient image template), so as to extract the brighter region from the image. To remove isolated small regions in the template, morphological filtering may be effected on the initial gray image template. For example, the initial gray image template is regarded as a binary image (a template point thereon has a value of 1, and a non-template point thereon has a value of 0), and then a 3*3 morphological erosion filtering and 5*5 morphological dilation filtering is performed on the image, so as to produce the final gray image template.

1.3 Variance Processing

Figure 6:
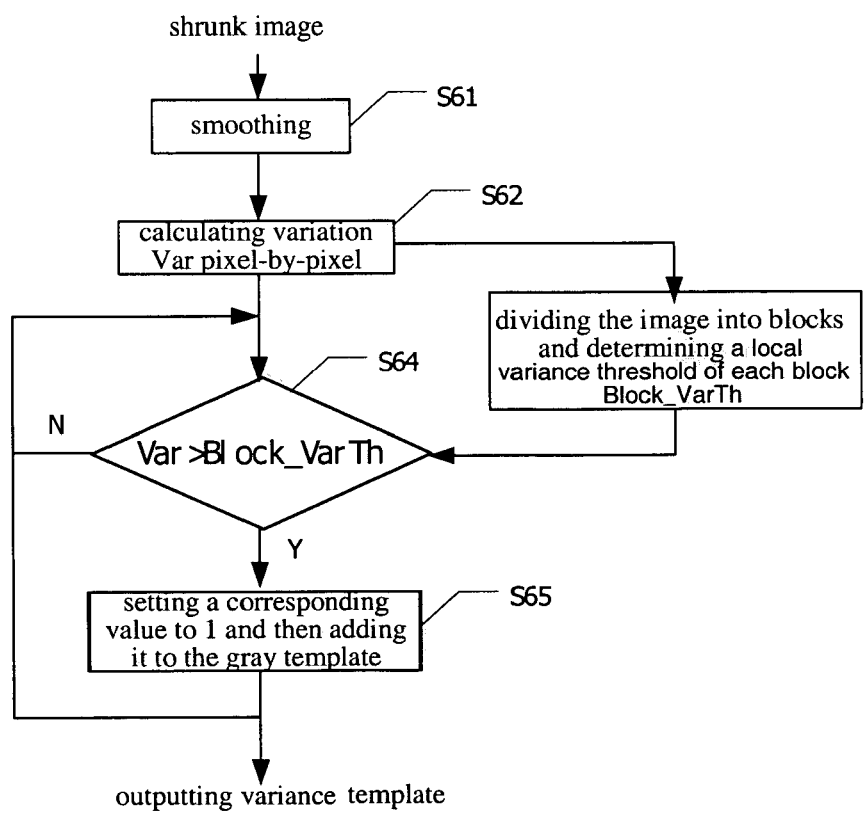
FIG. 6 shows a flow chart of generating a variance image template in the image segmentation process according to present invention.

FIG. 6 shows the generation process of the variance image template. First, at step S61, an appropriate smoothing is performed on the shrunk image $I_{shrunk}$, and then at steps S62, the variance Var is computed pixel-by-pixel as:

$$Var = \underset{3^*3neighbor}{E}\left[I - \underset{3^*3neighbor}{E}(I)\right]^2$$

Where E represents an average over a neighbor domain of each pixel. At step S63, the global variance image is divided into blocks (for example but not limited to herein, each block having a size of 9*9), and the mean variation of variance Block_Mean (Var) and Standard variation of variance Block_Std (Var) for each block are calculated. A local variance threshold Block_VarTh is determined based on the mean variation and the standard variation of variance.

For example (but not limited to), Block_VarTh=Block_Mean+Block_Std.

At steps S64 and S65, the variance Var is compared to the Block_VarTh and the pixels each having a variation greater than Block_VarTh are added into the gray image template. The process is repeated until all the pixels are compared. Thus a final variance image template is produced.

Here, the variance threshold Block_VarTh is a local threshold, so it's easier to capture regions in which gradient values of pixels are not large in the whole but the local variations are relatively large, including the weak boundary. These regions usually include the portions having structural features in relatively uniform regions. Although the gradient values in the portions are not large, they tend to attract a viewer, and thus need enhancing particularly. It is noted that the variance information needs to be used in combination with the gradient information; otherwise, for local regions having many strong boundaries, useful features may be lost when being segmented by only using the variance information.

1.4 Template Post-Processing

Figure 7:
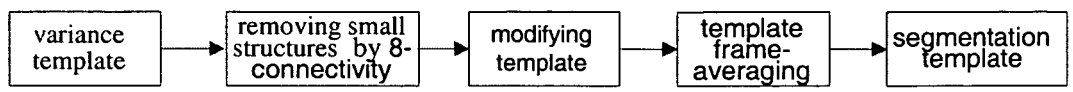
FIG. 7 shows a diagram of post-processing the variance image template in the image segmentation process according to present invention.

FIG. 7 illustrates a diagram of a template post-processing in the image segmentation. First, small structures are removed from the above obtained variance image template, by using, for example (but not limited to) 8-connectivity method. Then, a template modification and a template frame-averaging are applied so as to produce the segmentation template. Wherein, the template frame-averaging process is very useful and its description will be given below.

1.4.1 8-Connectivity

Removal of small structures with 8-connectivity method means to combine adjacent pixels into a connected region and remove the connected regions in which the number of pixels is less than a predetermined threshold value. Specifically, the 8-connectivity process comprises the following steps:

a) In the variance image template, searching for the template pixels line by line, and the first searched pixel is marked as marker value of 1. Hereafter, every time a template pixel is searched, the marker value is incremented by 1. This process is repeated up to the end of template. Thus a diagram of marker values is produced.

b) scanning the diagram of marker values, wherein for each pixel, its marker value is replaced by the minimum marker value in its 8 neighboring pixels. The process is repeated until the marker values in the diagram will no longer change. The pixels with the same marker value form a connected region.

c) removing the connected region If the number of pixels in the connected region is less than the predetermined threshold.

1.4.2. Template Modification

The template modification process is as follows:

1) rectifying the continuity of edges and structures of the image. By setting a region gradient-increasing threshold (for example, by multiplying GTh with a constant less than 1, such as 0.85) and searching around the template pixels, if the gradient value of one non-template pixel is greater than the threshold, the non-template pixel may be added into the template.

2) Further modifying the template to enable the template to have a reasonable structure. For a template pixel, if the number of template pixels in its 3*3 neighbors is below a constant (for example, 3), it will be modified as a non-template pixel. For a non-template pixel, if the number of template pixels in its 3*3 neighbors is greater than a constant (for example, 6), it will be modified as a template pixel. The term "template pixel" means a pixel with a value of 1 in the template, and "non-template pixel" means a pixel with a value of 0 in the template.

1.4.3. Template Frame-Averaging

To reduce harmful effect caused by a sudden change of template between neighboring frames in the image sequence, the template post-processing in the image segmentation according to present invention includes a process of averaging the segmentation template of continuous frames, which comprises the following steps:

a) setting a template frame-averaging matrix $M_{frame\_ave}$, the value for each element in the matrix is initialized according to the template modification result for the first image frame (or directly based on the aforementioned variance image template or other templates, and the description thereof is omitted herein). For example, if an element has a corresponding template point, the matrix value of the element is set to maximum $V_{max}$ (for example, 128+5), otherwise, if the element has no corresponding template point, the matrix value of the element is set to minimum $V_{min}$ (for example, 128−5). Here, as for the term of "template point", if a pixel in the segmentation template having the same location as in the template frame-averaging matrix is a template pixel, it is called as a corresponding template point, and called as a non-corresponding template point if it is a non-template pixel.

b) for the second frame and subsequent frames, modifying the value for each element in the matrix $M_{frame\_ave}$ according to the template modification result. If an element has a corresponding template point, its value is incremented by a constant (for example, 1). The value of an element having a non-corresponding template points will be decreased by a constant (for example, 1). If the value of an element is greater than $V_{max}$, its value is set to $V_{max}$; if the value for an element is below $V_{min}$, its value is set to $V_{min}$.

c) determining the segmentation template for the current frame according to the matrix $M_{frame\_ave}$. For example, the segmentation template may be set to only include the pixels corresponding to elements in the matrix each having a value greater than the predetermined value (for example, 128).

Figure 8:
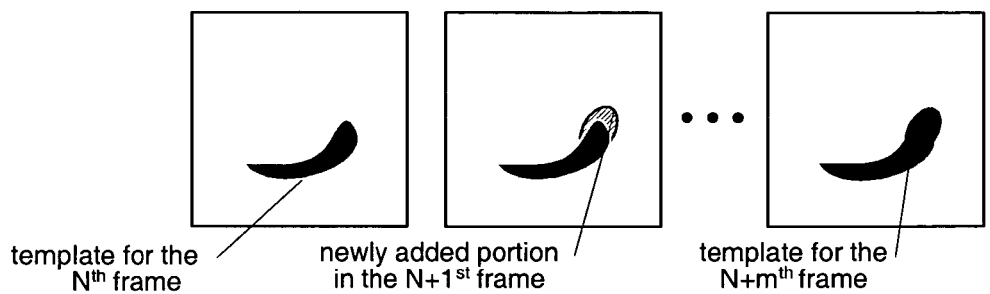
FIG. 8 shows a diagram of a template frame-averaging process according to present invention.

In this way, for a feature region newly added to the image template of the current frame, the feature region may be filled in as a part of the segmentation template only if several continuous frames for the feature region satisfy a condition of segmentation into the template (e.g. the pixel value of the corresponding point in the template frame-averaging matrix values is greater than 128). Thereby, the possibility of sudden change of template between frames is effectively reduced. As shown in FIG. 8, after the image segmentation blocks (excluding the template frame-averaging block) segment a new portion in the N+1$^{st}$ frame, the template doesn't expand immediately, but updates the corresponding part in $M_{frame\_ave}$. If this portion is to be segmented into the template in the subsequent frames, it will become a part of the template at the N+m$^{th}$ frame.

Figure 17A:
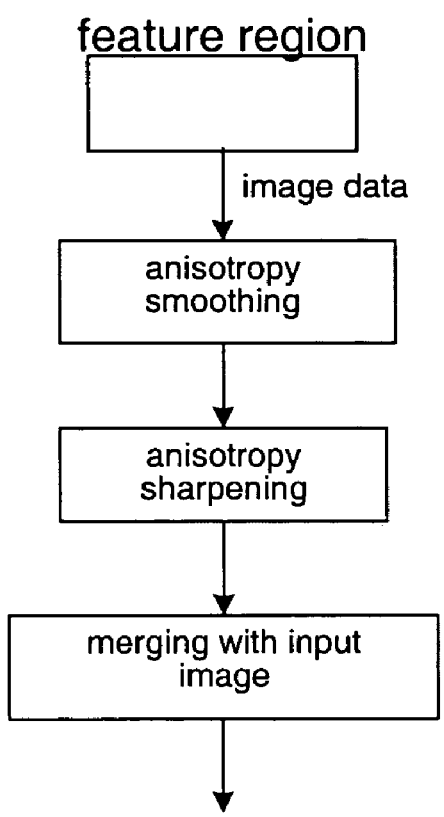
FIG. 17A and FIG. 17B show a diagram of the data processing on the image data classified as the feature region and non-feature region according to present invention, respectively.
Figure 17B:
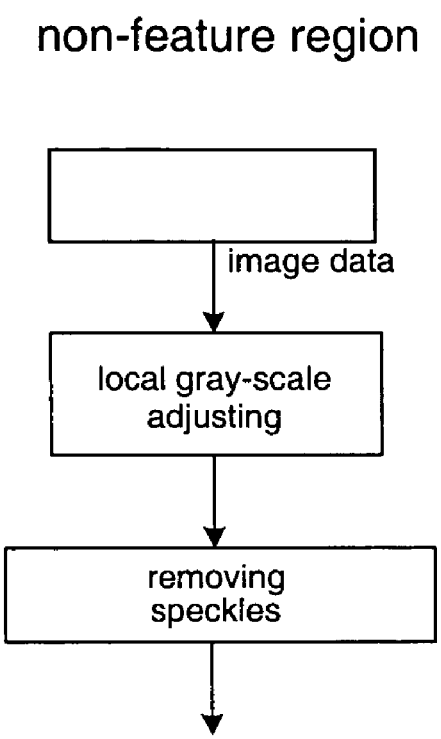

Once the segmentation template is determined, the feature region and non-feature region are determined. For example, the regions with value of 1 in the segmentation template are set as a feature region and the regions with value of 0 are set as a non-feature region. As shown in FIG. 17, the system will adopt different data processes on the feature regions and the non-feature regions, respectively. FIG. 17 shows a preferred embodiment, where anisotropy smoothing and anisotropy sharpening are performed on the image data classified as a feature region pixel-by-pixel, then the sharpened feature regions are merged with the input image $I_{in}$, so as to produce the enhanced result of the feature region. Local gray-scale adjustment is performed on the image data classified as a non-feature region so as to smooth the image for the purpose of mitigation of speckle noise, and then a detection and removal process of black speckles is further performed, thereby the non-feature region is enhanced. The above implementation mode, however, does not limit the scope of present invention, and equivalent variations also fall within the scope according to present invention. For example, the merging of the sharpened data in the feature regions and the input image $I_{in}$, may be delayed until the feature regions are to be merged with the non-feature regions.

2. Data Processing on Feature Regions

2.1 Anisotropy Smoothing

Figure 9:
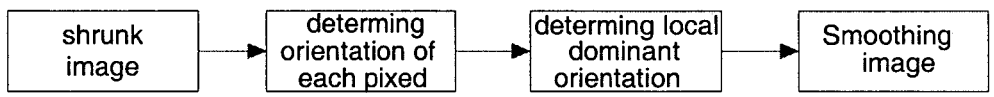
FIG. 9 shows a diagram of anisotropy smoothing the image data classified as the feature region according to present invention.
Figure 10:
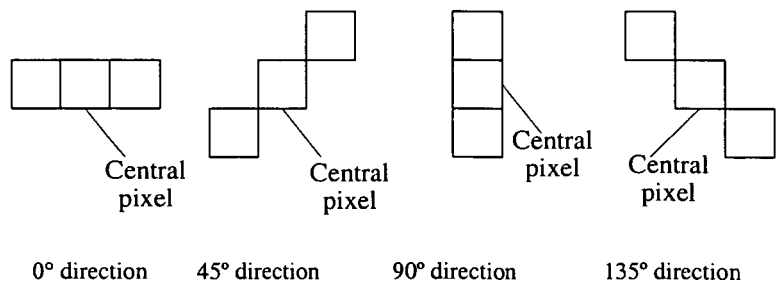
FIG. 10 shows an orientation in variance computation according to present invention.

FIG. 9 shows a process of anisotropy smoothing the image data classified as the feature region. In a feature region (may correspond to the shrunk image $I_{shrunk}$ of the input image or directly correspond to the input image $I_{in}$), several pixels centered on each pixel (as shown in FIG. 10, for example, but not limited to taking three pixels) are selected in the angle direction of 0°, 45°, 90° and 135° to compute the orientational variance in each direction, and the direction in which the orientational variance is at maximum is set as the orientation of this pixel. A small neighbor domain is selected around each pixel (for example, a 5*5 neighbor domain), centered on this pixel and based on the orientation of the pixel, the number of pixels in each direction in the neighbor domain of a pixel is counted and then the direction in which the number of pixels is at the maximum is determined as the local dominant orientation of the pixel. The local dominant orientation may be understood as a smoothed local gradient direction. Centered at the pixel, in a direction orthogonal to the local dominant orientation, a neighbor domain is selected to perform data smoothing on the pixel (for example, when the local dominant orientation is a zero degree direction and its orthogonal direction is a 90 degree direction, the neighbor domain includes the pixel and several pixels above and below it). For example, a weighted average of various pixels in the neighborhood may be computed, as the smoothed result represented by its gray scale intensity $I_{smoothed}$.

2.2 Anisotropy Sharpening

Figure 11:
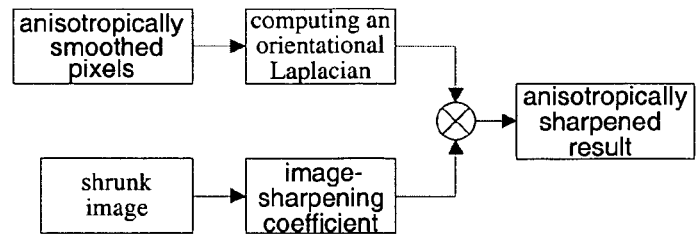
FIG. 11 shows a diagram of anisotropy sharpening the image data classified as the feature region according to present invention.

FIG. 11 shows the anisotropy sharpening process. An orientational Laplacian may be computed for the smoothed result $I_{smoothed}$ according to the local dominant orientation. For example, if the local dominant orientation for a pixel is the horizontal direction, three pixels, $I_{-1}$, $I_0$ and $I_{+1}$, are taken in the horizontal direction centered at the pixel $I_0$, where I represents the gray-scale Intensity of the pixel, and $$0°\ \text{Laplacian} = -I_{-1} + 2*I_0 + I_{+1}$$

is calculated. By multiplying the orientational Laplacian with an image-sharpening coefficient $R_{sharpen}$, the anisotropically sharpened result $I_{sharpened}$ is generated. The calculation of $R_{sharpen}$ is given by:

$$R_{sharpen} = C*\text{std}*(M_{frame\_ave} - MID)/5,$$

Where std is the standard variation for the gray image in the neighborhood (for example, a 3*3 neighbor) of each pixel in the shrunk image $I_{shrunk}$ (but not limited to $I_{shrunk}$, the input image or various smoothed or distorted image of the input image is also possible), $\text{std} = \sqrt{E[I-E(I)]^2}$ $M_{frame\_ave}$ is the template frame-averaging matrix obtained in image segmentation, MID is a predetermined value corresponding to the template frame-averaging matrix. In this embodiment, MID=128, C is a predetermined constant, for example, but not limited to C=20, and its value may be selected according to different ultrasound systems. The sharpening coefficient derived from the standard variation std presents three advantages. First, boundaries may be highlighted very nicely, because the standard variation in regions including edges of image is relatively larger. Second, the standard variation is smaller at the boundary of the template (i.e. the segmenting lines between the feature regions and non-feature regions), and the enhancement effect is relatively weak here, thus the transition from feature regions to non-feature regions is perfectly resolved without introducing artificial boundary. Third, the reliance of the enhancement effect upon the segmentation template is reduced significantly. Assuming the segmentation template includes excessively uniform regions, the disadvantageous effect caused by mistaken enhancement may be ignored because the standard variations in these uniform regions are very small. Here, the sharpening coefficient $R_{sharp}$ relates to the matrix $M_{frame\_ave}$, so that the image presents a progressive transition process in time when the segmentation template changes, to avoid occurrence of image flare.

2.3 Image Fusion

Figure 12:
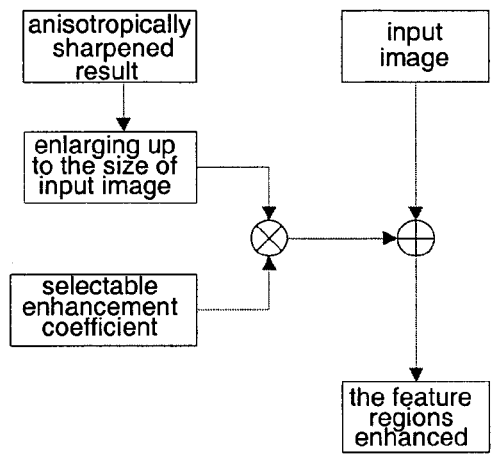
FIG. 12 shows a diagram of merging the feature region according to present invention.

FIG. 12 shows the merging of the orientational sharpened result of the feature region and the input image. The orientational sharpened result is enlarged up to the size of the input image (by using bilinear interpolation or other interpolation) and then multiplied with an enhancement coefficient selected by the user (e.g. a coefficient valued in a range of 1-2), and sequentially added to the input image $I_{in}$, to produce an enhanced result of the feature region.

3. Data Processing on Non-Feature Region 3.1 Local Gray-scale Adjustment

Figure 13:
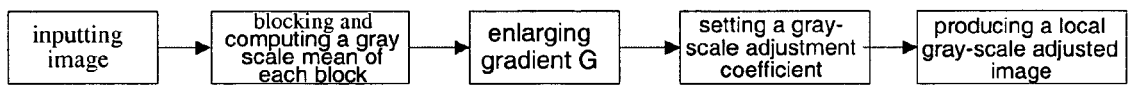
FIG. 13 shows a diagram of the local gray-scale adjustment process for a non-feature region according to present invention.

FIG. 13 shows a process of local gray-scale adjustment of the non-feature region according to a preferred embodiment, in which a local gray-scale compression algorithm is applied to, e.g., the input image $I_{in}$ to smooth the image. First, the image $I_{in}$ is divided into blocks (for example, but not limited to, blocks of 11*11), wherein some blocks may be overlapped with others at least in part to mitigate blocking effect, and a gray-scale mean $\text{Mean}_{block}$ is computed for each of the blocked images, to produce a mean images. The gradient G calculated in the image segmentation is scaled up to the size of the input image. For a relatively large G (for example, G is greater than 10), the gray-scale adjustment coefficient $R_{adjust}$ is set to a relatively large value (for example, 0.75), and for a relatively small G, $R_{adjust}$ is set to a relatively small value (for example, 0.6). After local gray-scale adjustment, an adjusted gray-scale intensity $I_{adjusted}$ is computed with the following equation:

$$I_{adjusted} = \text{Mean}_{block} + (I_{in} - \text{Mean}_{block})*R_{adjust}.$$

Figure 14:
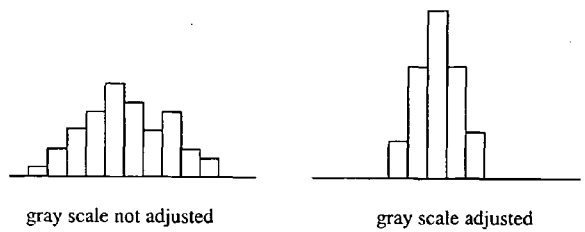
FIG. 14 shows a comparison between the histograms before and after the gray-scale adjustment of the non-feature region according to present invention.

After the local gray-scale adjustment, the local gray-scale for the image will decrease, which may be interpreted as the gray-scale histogram in local regions is compressed (as shown in FIG. 14, being compressed at the center of the local average gray scale) and it present to the eyes a sense of the image being smoothed. At the same time, for pixels with larger gradients, $R_{adjust}$ becomes larger accordingly and thus local fine features may be kept.

3.2 Black Speckle Mitigation

Figure 15:
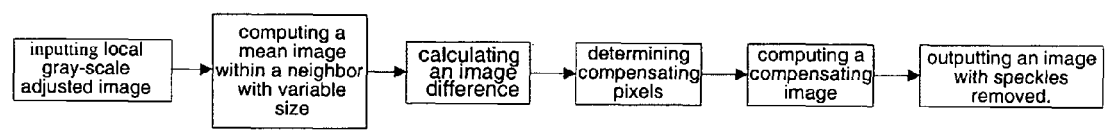
FIG. 15 shows a diagram of mitigating speckles in the non-feature region according to present invention.

After a local gray-scale adjustment, a process of black speckle detection and mitigation may be further applied, as shown in FIG. 15. The preferred embodiment provides a method for detecting and compensating the black speckles. First, for the local gray-scale adjusted image $I_{adjusted}$, its image gray mean $I_{mean}$ is computed by means of a neighbor domain of each pixel with variable size. Then, $I_{mean}$ is subtracted from the adjusted image $I_{adjusted}$, to produce a gray difference $I_{dif}$. A pixel with the corresponding difference $I_{diff}$ greater than a predetermined value (depending on different types of ultrasound systems) is determined as a compensating pixel, and the corresponding difference $I_{diff}$ of the compensating pixel is multiplied with a constant, to produce a compensating image represented by its intensity $I_{modify}$. A value corresponding to a non-compensating pixel in the compensating image is set to 0 (in another word, the non-compensating pixels are compensating pixels with compensating value of 0). At last, $I_{modify}$ may be added to $I_{adjusted}$ directly or via proper averaging, to remove speckles from the non-feature regions.

Figure 16:
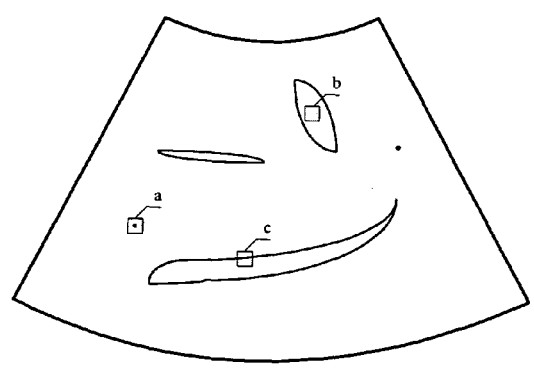
FIG. 16 shows a diagram of detecting black speckles according to present invention.

As best shown in FIG. 16, "a" represents a black speckle with its gray-scale below the surrounding pixels, and its gray scale intensity will change significantly after averaging over the surrounding small neighbors; "b" is within a large structure with consistent gray scale intensities and the gray scale intensities vary little after averaging; and "c" is on the edge of a large structure and the variation in gray scale intensities is medial after averaging. A proper threshold can be selected to distinguish the cases of "a" and "c", so as to detect the speckles. The speckles have very different sizes in near field and far field of the image, so neighbors with different sizes are needed to produce a mean image $I_{mean}$, and the size of the neighbor domain should be suitable for the sizes of speckles to be removed (for example, for an image with size 500*400, the size of neighbor domain in the near field may be selected to be 5*5, the size in the medium field to be 7*7 and the size in the far field to be 9*9). In this way, black speckles with a predetermined size (determined by the size of neighbors to be averaged) may be detected and the compensation amount may be determined according to the gray-scale difference between the speckles and the surrounding pixels. By such a processing, black speckles may be mitigated effectively while bringing very small blurring effect to other regions.

Please note that, the above local gray level adjustment is not necessary for the mitigation of black speckle, said mitigation may be applied directly to the input image $I_{in}$ without local gray scale adjustment, and the procedure is similar.

The above embodiments had been tested by a (but not limited herein) black/white digital B-mode ultrasonic system, which verifies that the image quality may be improved greatly by using the method of image enhancement and speckle mitigation of present invention.

While the above descriptions are made to some specific embodiments, it's to be noted that these embodiments are merely illustrative and preferred and that a person skilled in the art may make various changes and modifications to the embodiments. As can be seen from the above embodiments, the segmentation template is obtained through a template construction process based on gradient, gray-scale and variance, and template post-processing based on small structure removal, template modification and especially template frame-averaging, and thus the image is segmented into a feature region and a non-feature region based on the segmentation template, Wherein the template construction process is a basis for image enhancement, so a person skilled in the art can produce a segmentation template with existing technology in the prior arts based on the constructed template of present invention, including (or not including) template post-processing to modify the template. Compared with prior arts, the resulted ultrasound image is also enhanced correspondingly.

Furthermore, even in the above template construction process, the variance processing therein is not necessary, for example. Although variance processing may reflect the true structure information finely, it may be omitted and only gradient and gray-scale processing is used in case image quality is not expected to be very high, which may simplify computation and save cost.

Similarly, in the template post-processing according to present invention, not all of the 8-connectivity, template modification and template frame-averaging provided in the invention are necessary. For example, it is possible to apply the template frame-averaging to the variance template, which has been pointed out in the previous embodiments.

Moreover, in the embodiments according to present invention, the data processing on the feature regions is exemplary. For example, in the practice of present invention, it is also possible to only choose anisotropy smoothing based on the specific situation, to simplify computation and processing.

It is possible to make various combinations and deletions of the disclosed embodiments and therefore, the scope according to present invention is to be defined by the appended claims.

What is claimed is:

1. A method for enhancing an ultrasound image for use in an ultrasound imaging system, comprising steps of:
   a) operating a computing device of the ultrasound imaging system to read the ultrasound image;
   b) segmenting the ultrasound image into a feature region and a non-feature region based on applying a gradient threshold and a gray threshold, respectively, to gradient information and gray-scale information in the image, and then performing different data processing on the image classified as the feature region and the non-feature region respectively, wherein the data processing on the image data classified as the non-feature region comprises a step of smoothing the image by using a local gray-scale adjustment of various pixels, comprising sub-steps of:
   dividing the input image into blocks, and computing a gray scale mean of each blocked image, $Mean_{block}$;
   setting different gray-scale adjustment coefficients $R_{adjust}$ based on the different gradient values of various pixels in the input ultrasonic image; and
   computing an adjusted gray scale intensity $I_{adjusted}$ to produce a local gray-scale adjusted image, $I_{adjusted}=Mean_{block}+(I_{in}-Mean_{block})*R_{adjust}$, where $I_{in}$ represents the gray scale intensity of the input image;
   c) merging the processed feature region and non-feature region to produce an enhanced image; and
   d) displaying the enhanced image on a display device of the ultrasound imaging system.

2. The method according to claim 1, wherein the data processing on image data classified as the non-feature region further comprises a step of detecting and compensating black speckles which comprises sub-steps of:
   computing a mean image represented by its gray scale intensity $I_{mean}$ for the input image $I_{in}$ or the local gray-scale adjusted image $I_{adjusted}$ by using a neighbor domain of each pixel with variable size;
   determining a compensating pixel and its respective compensating amount based on the mean image $I_{mean}$; and
   adding the compensating amount for each compensating pixel into the input image $I_{in}$ or the local gray-scale adjusted image $I_{adjusted}$, to remove the speckles from the non-feature regions.

3. The method according to claim 2, wherein the compensating pixel comprises a pixel for which an image difference $I_{diff}$ obtained by subtracting the mean image $I_{mean}$ from the input image $I_{in}$ or the local gray-scale adjusted image $I_{adjusted}$ is greater than a predetermined value; and
   the compensating amount for the compensating pixel is multiples of the respective difference $I_{diff}$.

* * * * *